(No Model.)
G. & E. JANSSEN.
PROCESS OF DISTILLING GREASE AND OTHER FATTY SUBSTANCES.
No. 414,709. Patented Nov. 12, 1889.
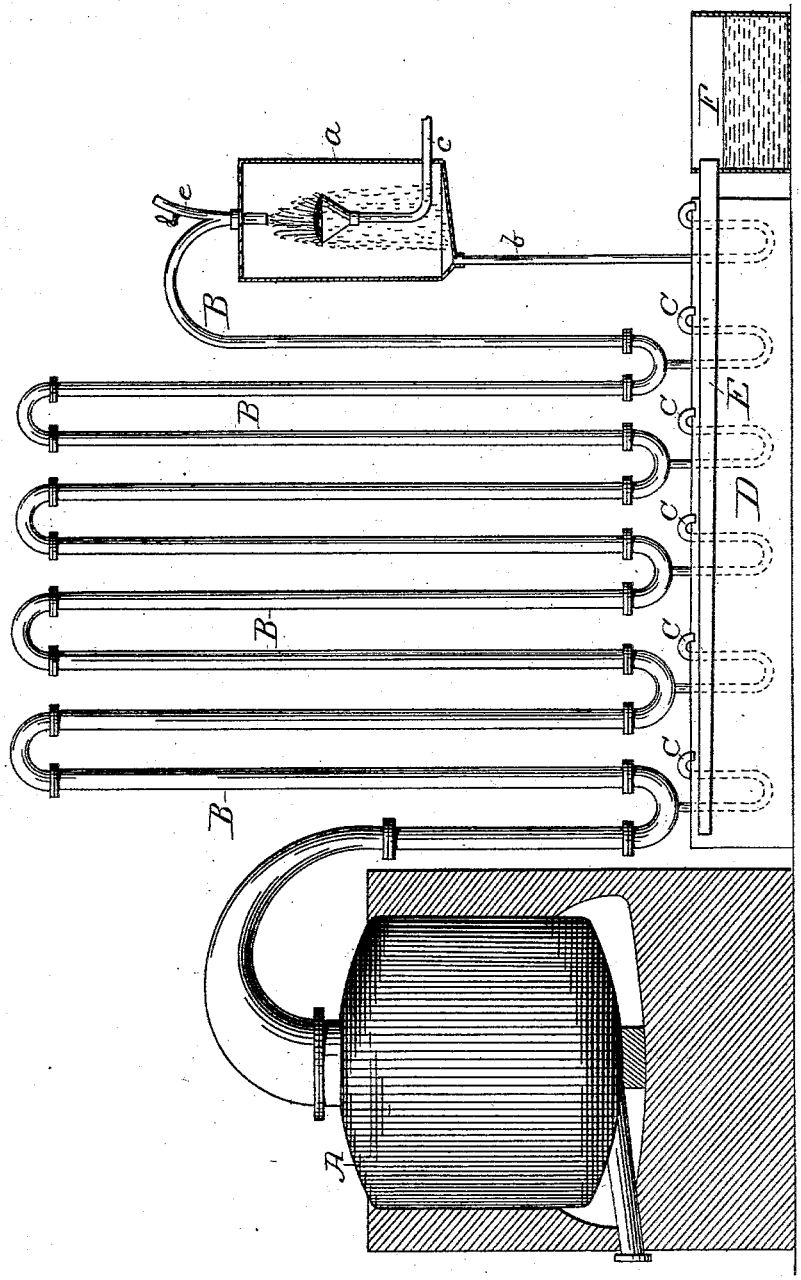

UNITED STATES PATENT OFFICE.

GUSTAVE JANSSEN AND EDOUARD JANSSEN, OF CHICAGO, ILLINOIS, ASSIGNORS TO THE E. SCHNEIDER & COMPANY, OF SAME PLACE.

PROCESS OF DISTILLING GREASE AND OTHER FATTY SUBSTANCES.

SPECIFICATION forming part of Letters Patent No. 414,709, dated November 12, 1889.

Application filed April 30, 1888. Serial No. 272,361. (No specimens.)

*To all whom it may concern:*

Be it known that we, GUSTAVE JANSSEN and EDOUARD JANSSEN, of Chicago, in the county of Cook and State of Illinois, have discovered and invented a certain new and useful Process of Distilling Grease and other Fatty Substances, of which the following is a full, clear, and exact description, reference being had to the accompanying drawing and the letters of reference marked thereon.

Heretofore grease and fatty substances have been distilled in the following manner: A still of the usual construction and of suitable dimension is charged with, say, ten thousand pounds of grease, which quantity is maintained during its operation. It is at first gradually heated by fire, either directly or indirectly, until the mass acquires a temperature of from 300° to 400° Fahrenheit, and when this temperature is reached superheated steam is injected into the mass at a point near the bottom of the still, so as to raise the temperature of the mass to the distilling-point. The superheated steam is injected into the still in the first place at a very low pressure; but as the mass increases in temperature the pressure is increased to from fourteen to sixteen pounds. Distillation commences when the mass in the still reaches a temperature of from 450° to 500° Fahrenheit, and slowly increases in volume until 550° to 575° Fahrenheit is reached, at which point, under fourteen pounds pressure, the best and maximum result is obtained. This result could be greatly increased if the vapors of distillation could be exhausted from the still through the condensation-coils more rapidly and the steam-pressure increased. Long experience has demonstrated, however, that every attempt to increase the steam-pressure results in the blowing out of the coils the uncondensed steam and vapors of grease and fatty substances.

The object of our invention is to increase the daily output of a still from eighty to one hundred per cent. more than has been ever before accomplished, to distill with best effect at a temperature nearly 100° Fahrenheit less than was heretofore thought possible, and to inject superheated steam at from twenty to thirty-five pounds pressure. As a result of all this, aside from the increased output, we distill white stock nearly to the end of the distilling operation, with but four and one-half per cent. tar residuum as against five to eight per cent. under the process heretofore in use. We accomplish this result by exhausting the vapors issuing from the end of the condensing-coils (which heretofore have been permitted to escape in the free atmosphere) into a condensing-chamber, where, by mingling said vapors with a jet or spray of cold water, we condense the fatty acid vapors not before condensed while in transit through the condensing-coils and kill the obnoxious smell thereof. When the escaping vapors are thus condensed, the velocity of the vapors in transit through said condensing-coils is greatly increased and the pressure above the boiling mass in the still is removed to such an extent as to cause a partial vacuum above the same. This it is that enables the still to distill at a less temperature, permits more steam-pressure, and increases the output, substantially as hereinafter more fully described, and as illustrated in the drawing, which shows a side elevation of a still of the usual construction having applied thereto the means we make use of to perform our improved process.

In the drawing, A represents a still of the usual construction; B, the condensing-coils; C C, the outlet-pipes leading from the lower bends of said condensing-coils; D, the cooling-trough into which said outlet-pipes dip; E, a trough into which said outlet-pipes empty, and F the stock-vat which receives the liquid products flowing from said trough, substantially as shown.

The construction, arrangement, and operation of the elements above enumerated are the same as in the still now in common use, and we do not wish to be considered as herein claiming any invention therein.

At the end or mouth of the condensing-coils, which has heretofore been projected into the open atmosphere, we provide a condensing-chamber *a*, of any suitable shape or dimensions, preferably having its bottom dipped or inclined downward toward the mouth of the drain *b*, so as to facilitate the drainage of the products of condensation from said chamber into said pipe. The vapors from said condensing-coils discharge into chamber *a* about the center of the closed top thereof and are immediately brought in contact with a spray of cold water from the fountain *c*. This fountain consists of a sprinkler secured to the end of a water-pipe which enters said chamber at its side at a point near its bottom, and then rises vertically and centrally in said chamber to a plane sufficiently near to the mouth of the condensing-coils to project the water into and among the vapors issuing therefrom. The water coming in contact with the said vapors condenses them, whereupon they fall to the bottom of the chamber *a* and are drained therefrom by drain-pipe *b*. Such purely aqueous vapors as are created by this sudden cooling in said chamber *a* of the discharge of the condensing-coils exhaust from pipe *e* in the top of the chamber, as shown. The lower end of drain-pipe *b* dips down into the cooling-trough D, the same as do the outlet-pipes C, and likewise empties into trough F, substantially as shown. The sudden chilling of the vapors discharged from the mouth of the condensing-coils creates a vacuum and causes a suction of the vapors through said condensing-coils, which hastens their transit through and relieves the pressure above the boiling mass in the still. This removal of the gaseous pressure above the boiling mass in the still permits the said mass to boil sooner and vaporize at a temperature nearly 100° Fahrenheit less than could possibly be done under the old process. As a result of the mass being subjected to a less heat, it does not become injured. The rapid transit of the vapors through the condensing-coils permits the use of a much greater steam-pressure, ranging from twenty to thirty-five pounds, thus greatly increasing the output of the apparatus, which would otherwise be impossible.

We are aware that there are processes for distilling glycerine in which a condensing-chamber at the end of the condensing-coils is used. In this condensing-chamber, however, the water is not brought in direct contact with the issuing vapors, but is injected into a receptacle within said chambers, against the sides of which the vapors strike and are condensed to a greater or less extent. Should the glycerine-vapors intermingle with the cold water, a dilution therewith would be the result, which it is one of the objects of the distillation to prevent. Why this is so will, aside from the fact of dilution, be readily comprehended when it is considered that the cold water which is used in these processes is chemically impure, containing, as it does, all of those foreign ingredients which common water ordinarily contains. In our process the impurities in the water cut no figure, because when the fatty acid vapors are condensed they float on the surface of the water in the trough into which said water is drained and are skimmed therefrom.

What we claim as new is—

1. The process of distilling grease, consisting of vaporizing the grease in a still, condensing the same in the condensing-coils, and finally intermingling the vapors issuing from the end of the condensing-coils with cold water.

2. The process of distilling grease, consisting of, first, vaporizing the grease in a still at from 450° to 500° Fahrenheit with a steam-pressure of from twenty to thirty pounds; second, condensing said vapors in the condensing-coils of said still, and, third, intermingling the vapors issuing from the end of said condensing-coils directly with a spray of cold water, as set forth.

GUSTAVE JANSSEN.
EDOUARD JANSSEN.

Witnesses:
FRANK D. THOMASON,
LOUIS S. THOMASON.